United States Patent
Nahar et al.

(10) Patent No.: US 7,522,434 B2
(45) Date of Patent: Apr. 21, 2009

(54) TEMPERATURE ESTIMATION BASED ON A SIGNAL OSCILLATION

(75) Inventors: Anusheel Nahar, Watertown, NY (US); Robert Donald Lorenz, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 396 days.

(21) Appl. No.: 11/260,885

(22) Filed: Oct. 27, 2005

(65) Prior Publication Data

US 2007/0097718 A1 May 3, 2007

(51) Int. Cl.
*H02M 7/00* (2006.01)
(52) U.S. Cl. ..................................................... 363/65
(58) Field of Classification Search ............... 323/265, 323/273, 282; 363/65
See application file for complete search history.

(56) References Cited

U.S. PATENT DOCUMENTS

| | | | |
|---|---|---|---|
| 4,125,800 A | 11/1978 | Jones | |
| 4,445,180 A * | 4/1984 | Davis et al. | ................. 700/289 |
| 4,727,450 A | 2/1988 | Fachinetti et al. | |
| 5,122,727 A | 6/1992 | Janssen et al. | |
| 5,493,154 A | 2/1996 | Smith et al. | |
| 5,610,452 A | 3/1997 | Shimer et al. | |
| 5,745,355 A | 4/1998 | Tracy et al. | |
| 5,905,645 A | 5/1999 | Cross | |
| 6,167,329 A * | 12/2000 | Engel et al. | ................. 361/93.2 |
| 6,301,133 B1 | 10/2001 | Cuadra et al. | |
| 6,664,657 B2 | 12/2003 | Hailey | |
| 2006/0152204 A1* | 7/2006 | Maksimovic et al. | ....... 323/284 |

OTHER PUBLICATIONS

Anusheel Nahar and R.D. Lorenz, "Relative Temperature Control of Parallel Modules to Achieve Load Sharing", WEMPEC Annual Review Meeting, Mar. 23-24, 2005.

\* cited by examiner

*Primary Examiner*—Adolf Berhane
(74) *Attorney, Agent, or Firm*—Foley & Lardner LLP

(57) ABSTRACT

A method of estimating a temperature at a component of a device is provided. The temperature may be used to provide thermal load management of the device. In an exemplary embodiment, a switched mode power converter includes a power converter module and a switch that controls a switching cycle of the power converter module. A signal includes a bus voltage component and an oscillating signal component at least partially caused by switching of the switch. A switch instant of the switch can be isolated. A characteristic of the oscillating signal component of the signal can be detected. For example, a first peak voltage of the oscillating signal component can be detected after the switch instant. The temperature of the power converter module is estimated using the detected characteristic of the oscillating signal component. For example, the temperature can be estimated using the first peak voltage and best-fit curve parameters in solving a linear or a quadratic equation.

37 Claims, 11 Drawing Sheets

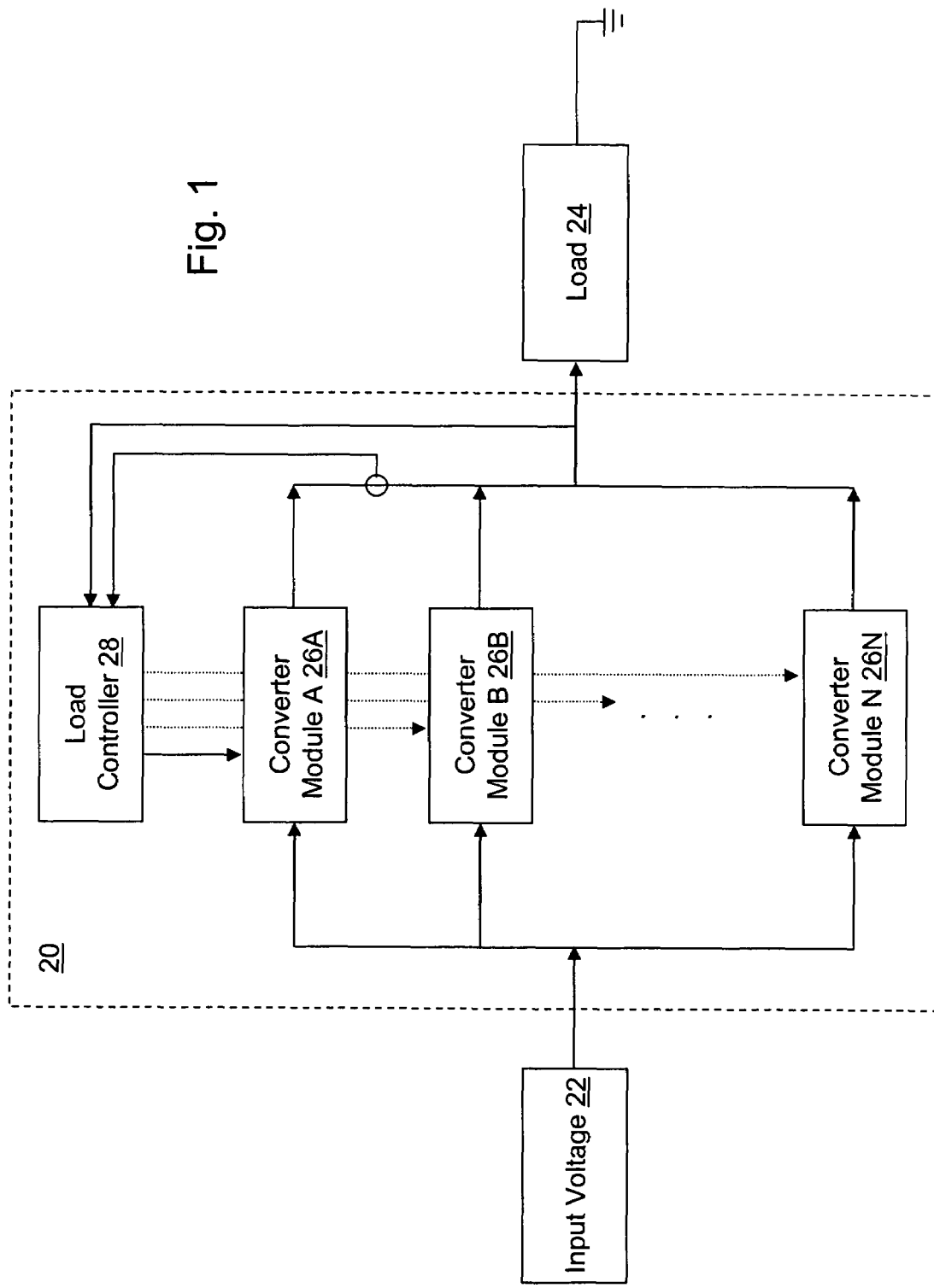

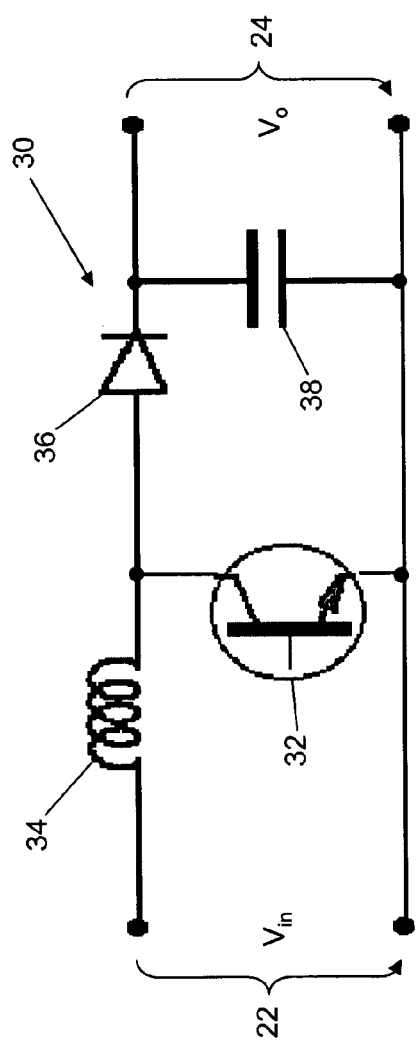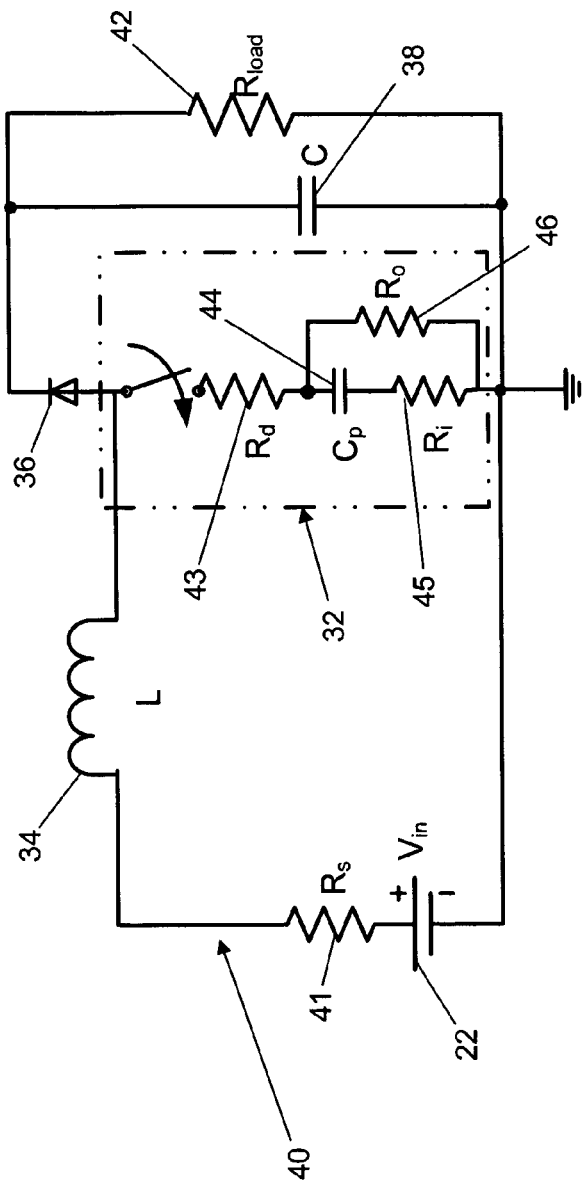

US 7,522,434 B2

TEMPERATURE ESTIMATION BASED ON A SIGNAL OSCILLATION

REFERENCE TO GOVERNMENT RIGHTS

This invention was made with United States government support awarded by the following agency: NSF 9731677. The United States government has certain rights in this invention.

FIELD OF THE INVENTION

The subject of the disclosure relates generally to semiconductor switches and to power converters that include semiconductor switches. More specifically, the disclosure relates to estimates of a temperature of the semiconductor switch or of a power converter module.

BACKGROUND

A power converter converts power from one form (voltage, current, etc.) to another form more suitable for a specific application. A typical power converter consists of a semiconductor device that manipulates power flow. Example power converter types include a buck converter, a boost converter, and a buck-boost converter. A buck converter is used to step down the input voltage. A boost converter is used to step up the input voltage. A buck-boost converter acts both as a boost converter and a buck converter. Thus, a buck-boost converter is used to step up or step down depending on the control signals.

A power converter may be classified as switched mode or as non-switched mode. The semiconductor devices in non-switched mode power converters operate continuously. A switched mode power converter employs semiconductor devices as switches. The semiconductor devices are switched at a high frequency and their state (on or off) is determined by external signals sent from a controller. Because it is switched at a high frequency, the power flow is determined by the average time spent by the device in an on state as compared to the off state. By varying the amount of time spent by the switch in the on state as compared to the off state during a single switching cycle, the average properties of the power flow can be controlled.

Power converters often include multiple power converter modules that are arranged in parallel. Instead of a single power converter, multiple power converter modules are connected to supply a common load. The power converter modules provide power to a common load from a common source. Thus, the inputs and the outputs of the power converter modules are tied together, respectively. Paralleled power converter modules generally are used in high power applications of greater than one kilowatt, for example, in data servers, in electric vehicle drives, etc.

Power flow through a conductor has associated losses that are dissipated as heat. Thus, power flow through the power converter generates heat. Excessive heating detrimentally affects each power converter module causing it to age and possibly to fail prematurely. Based on statistical thermodynamics, it is well established that, for every 10° C. rise in average temperature, the lifetime of the power converter module is reduced by a factor of two. Thermal load cycling and the resulting induced cyclical stress on the power converter module can be major factors leading to failure of the power converter.

Power converter modules are expected to be rugged and to withstand severe external stresses. The semiconductor devices in switched mode power converter modules have a high thermal sensitivity. As a result, the heat must be removed efficiently to prevent failure or even destruction of the device. Different modules may undergo different environmental conditions leading to differential heat dissipation that in turn leads to some modules running hotter than the others. Some of the causes of differential heat dissipation are dirty heat sinks, poor air flow over some modules, geometric asymmetries, and different ambient conditions. To maintain acceptable reliability levels, existing approaches significantly over-design the system and add redundancy. These approaches can greatly increase the cost, the size, and the weight of the power converter and degrade the life time, mean time to failure, reliability, and availability of the power converter.

To prevent over designing and avoid the consequent costs while maintaining the same reliability, the relative temperature of the power converter modules should be controlled. Thus, if one module is operating at a higher temperature in comparison to the other modules, that module should be allocated a reduced load to generate less heat thereby lowering its operating temperature. In response, the load of the remaining modules increases to maintain support to the common load. In some power converters, the temperature of the modules is actively monitored using sensors. Such systems require additional communication channels, cables, and temperature sensors. The result is increased system cost and complexity and potentially degraded reliability. What is needed therefore is a system and a method that provide the temperature of a power converter module to allow thermal load management. What is further needed is a system and a method that provide the temperature of the power converter modules without use of additional communication channels, cables, and/or temperature sensors.

SUMMARY

An exemplary embodiment of the present invention utilizes a common bus of the power converter as a free communication channel accessible by each power converter module. Depending on the power converter design, the bus may be an input or an output current bus carrying the power from the power source and to the load respectively. Switching of a semiconductor device of a switched mode power converter introduces a ringing or oscillating signal as a result of device parasitics on the common bus. The ringing signal is weakly dependent on the temperature of the switched power converter module and strongly dependent on the duty ratio (off state voltage determined by duty ratio) where duty ratio is the on time relative to the off time of the power converter module. The duty ratio effect can be decoupled from the temperature effect on the ringing signal characteristics. Using the oscillating signal available on the common bus, no additional communication channels, cables, or temperature sensors are needed to estimate the temperature at each power converter module. Using the temperature estimation at each power converter module, thermal load management can be performed to balance the thermal load across multiple power converter modules.

A method of estimating a temperature at a component of a device is provided. The temperature may be used to provide thermal load management of the device. Switching of a switch of the device at least partially causes an oscillating signal component within a signal processed at the device after each switch instant. The method includes, but is not limited to, isolating a switch instant of the switch, detecting a characteristic of the oscillating signal component, and estimating a temperature of the component of the device using the detected characteristic. The temperature can be estimated using either a linear or a quadratic equation of the temperature and best-fit parameters defined from curve fitting temperature data.

Another exemplary embodiment of the invention includes computer-readable instructions that, upon execution by a processor, cause the processor to estimate the temperature at the component of the device. Yet another exemplary embodiment of the invention is a power converter module that includes an interface circuit to detect the characteristic of the oscillating signal component, instructions to estimate the temperature at the component using the detected characteristic, and the processor. The interface circuit includes a timing circuit to isolate the switch instant and a detector circuit to detect the characteristic of the oscillating signal component.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals will denote like elements.

FIG. 1 is a block diagram of a paralleled power converter in accordance with an exemplary embodiment.

FIG. 2 is a circuit diagram of an exemplary boost converter type power converter.

FIG. 3 is a high frequency equivalent circuit model at the switch instant of the boost converter of FIG. 2.

DETAILED DESCRIPTION

Figure 4:
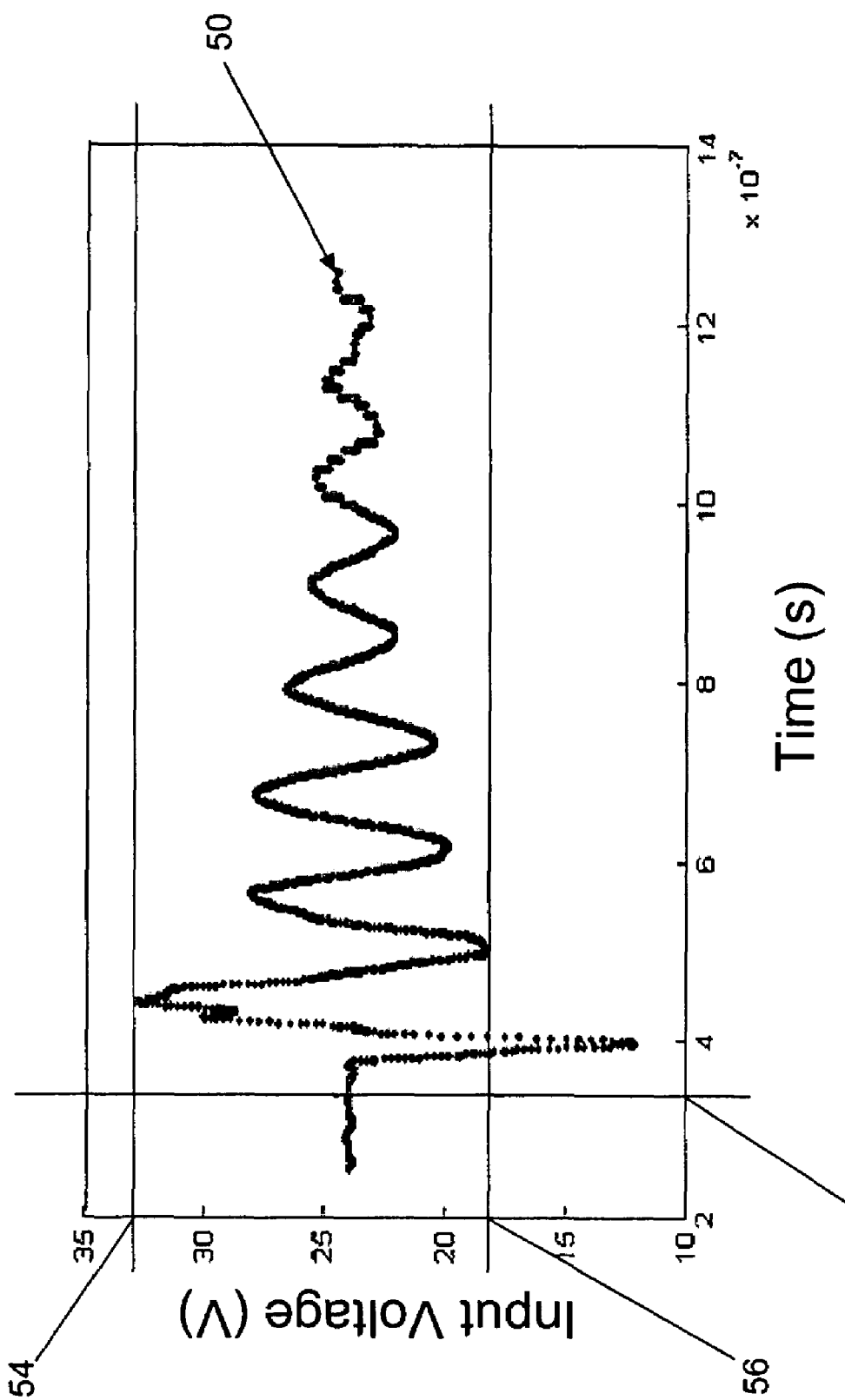
FIG. 4 is a graph illustrating an oscillating signal obtained from a common input bus to the boost converter of FIG. 2 near the turn-on switch instant in accordance with an exemplary embodiment.

A switched mode power supply module typically consists of silicon based switching devices that, for example, may include insulated gate bipolar transistors (IGBT) or metal-oxide semiconductor field effect transistors (MOSFET) and diodes. These switching devices are switched at a high frequency (typically >10 kilohertz (kHz)) to manipulate the power flow. The power is manipulated by controlling the amount of time the switch is on/off during a switching cycle. The ratio of time in an on state to the switching cycle time is known as the duty ratio. Duty ratio may be varied with time to manipulate power flow under changing conditions. Thus, the duty ratio, which can be varied independently in each power converter module, defines the operation of the switching devices.

With reference to FIG. 1, a schematic diagram of a paralleled power converter 20 is shown. An input voltage 22 (source) is provided to paralleled power converter 20. Paralleled power converter 20 provides the appropriate power to an output load 24. Paralleled power converter 20 may include a plurality of paralleled converter modules 26A, 26B, ..., 26N controlled by a load controller 28 and sharing the same output load 24.

Load controller 28, for example, may use current mode control and/or voltage mode control. Using current mode control, the current flowing in each module is under closed loop current control so that no circulatory current flows. Current mode control uses a semiconductor integrated circuit (IC) that controls the current input to each paralleled converter module 26A, 26B, ..., 26N based on an input voltage. By providing a common reference voltage, current mode control automatically allows current sharing. The reference for the current loop is generated by the error signal between the measured and the reference voltage. Current mode control generally is preferred over voltage mode control because it allows clamping of the module output current on a cycle by cycle basis. Additionally, the dynamics of the converter module demonstrates a single pole roll-off which is easier to control as compared to voltage mode control which demonstrates two pole roll-off. Current mode control also requires fewer output inductive components in the converter, and provides stiffening of the current actively by the controller. Output voltage can be controlled by closing the voltage loop outside the current loops.

Power converter modules 26A, 26B, ..., 26N include passive components such as capacitors and inductors to make the voltages and currents stiff on both the source side and the load side. The passive components filter the voltage and current oscillations caused by the switching of the devices. Use of a higher switching frequency reduces the size of the passive components and the oscillation in the input and the output current and voltage. Depending on the converter design, a ringing or oscillating signal is observed on the bus connecting the common source to the various modules and is observed on the bus connecting the common load to the various modules. The oscillating signal results from excitation of an effective inductor-capacitor-resistor (LCR) circuit resulting from the sudden switching of the semiconductor switch. Because the input and output bus are common to all of the converter modules 26A, 26B, ..., 26N, the oscillating signal is available to all of the of the converter modules 26A, 26B, ..., 26N through the bus though the oscillating signal may be measured at additional locations in the circuit. The oscillating signal is temperature dependent. The temperature information can be extracted from the ringing signal, thus rendering the common input and output busses as effective communication channels and allowing an estimation of the temperature of each power converter module at each power converter module 26A, 26B, ..., 26N.

With reference to FIG. 2, the origin of the oscillating signal in a boost converter circuit 30 is described. The boost converter circuit 30 includes a switch 32, an inductor 34, a diode 36, and a capacitor 38. Switch 32 is the semiconductor device. At the turn-on switch instant, switch 32 receives a gate pulse, and the switch undergoes a change of state from off (cut-off) to on (saturation). The switch instant may be on the order of 100 nanoseconds. If the states before and after turn-on are compared, the voltage 24 across the boost converter circuit 30 changes from a high value to a low value. Conversely, the current rises from zero to a value approximately equal to the average current drawn from the source. When the switch is off the voltage across the circuit 30 is large and determined by the duty ratio and topology of the device. When it is on, the voltage drop is determined by the device characteristics and is typically small. The difference between the on state and the off state voltage is the excitation, which drives circuit 30 and produces the oscillating signal. The off state voltage drop can be estimated from the input and output voltage for most power converter topologies and is thus readily available.

With reference to FIG. 3, an equivalent circuit 40 of the boost converter circuit 30 just after the turn-on switch instant is shown including a parasitic capacitor 44 that is on the order of a few picofarads. Equivalent circuit 40 represents a power MOSFET semiconductor switch. Equivalent circuit 40 includes a source resistor 41, switch 32, inductor 34, diode 36, capacitor 38, and a load resistor 42. Switch 32 can be modeled as a drain resistor 43, in series with parasitic capacitor 44 and an input resistor 45. An operating point resistor 46 is in parallel with parasitic capacitor 44 and input resistor 45. The critical component in the switch model is parasitic capacitor 44 across the drain and source or across the collector and emitter of the semiconductor switch 32. The resistors 43, 45, 46 account for temperature dependence of the semiconductor switch 32.

In an alternative embodiment, an IGBT semiconductor switch can be modeled similarly for small signal excitation. Fundamentally, the IGBT semiconductor switch includes a parasitic capacitor and a resistance network, which are the components that generate the ringing phenomenon. The difference between the models for the IGBT semiconductor switch and the MOSFET semiconductor switch is the presence of a current source on the output side in the IGBT semiconductor switch versus a voltage source in the MOSFET semiconductor switch, in the small signal model. These devices are operated under saturation in a turned-on state. Based on the principle of superposition, for the IGBT, the current source becomes an open circuit when the system operates under saturation resulting in the effective circuit of FIG. 3. For a MOSFET, the voltage source becomes a short circuit when the system is in saturation, but the series resistance of the voltage source appears across the output resistance ($R_o$) leading to fundamentally similar models for analysis.

Inductor 34, generally on the order of a few millihenries, stiffens the current input to the boost converter. The value of source resistor 41 plus input resistor 45 plus drain resistor 43 is less than a few ohms. Because this resistance value is much smaller than twice the square root of the ratio of inductor 34 to parasitic capacitor 44 (mainly due to the small value of parasitic capacitor 44), equivalent circuit 40 is an LCR circuit that produces an under damped decaying exponential response in current governed by the complex eigenvalues of the characteristic equation shown in (1).

$$s^2 L + (R_s + R_i + R_d)s + C_p = 0 \qquad (1)$$

The oscillating current is driven through source impedance 41 and an oscillating voltage appears across it. The oscillating voltage, when measured across the bus, appears as a ringing signal added to the terminal bus voltage. At a turn-off switch instant, an excitation opposite that of the turn-on switch instant is driven through source resistor 41 creating another oscillating signal. An oscillating signal is similarly generated using other switched mode power converter topologies based on an LCR circuit that effectively exists at a switch instant. For example, in a buck converter implementation, the inductor is on the output side of the circuit. As a result, the ringing signal is expected to be more pronounced on the output side containing the large inductance as opposed to the input side of the boost converter topology. Thus, depending on the power converter module topology, an oscillating signal may be more pronounced on either the input bus side or the output bus side and exists in the current and voltage signals. The ringing signal is also present at additional locations in the circuit. Use of the input or output bus, however, provides a communication channel accessible at each power converter module.

Typically, the source has a large electrolytic capacitor across its terminals to stiffen the voltage seen by the switches and diodes. The electrolytic capacitor reduces the oscillation in the voltage signal produced due to switching. The oscillation in the voltage signal has a fundamental frequency component equal to the switching frequency. The switching frequency typically is on the order of 10-90 kHz. At such high frequencies, the electrolytic capacitor does not act like a capacitor because its equivalent series lumped resistance and equivalent series inductance dominate over the capacitive reactance. As a result, the electrolytic capacitor connected in parallel across the source terminals fails to mitigate the high frequency ringing. Thus, despite attempts to remove the oscillations included in the signal, an oscillating signal component is present on the common input and/or output bus and is available to all converter modules 26A, 26B, 26N. Shown with reference to FIG. 4 is an exemplary oscillating signal component 50 obtained from the common input bus to a DC boost converter resulting immediately after a switch instant 52. The resulting input voltage to converter modules 26A, 26B, ..., 26N includes a first positive peak voltage value 54 followed by a first negative peak voltage value 56.

Ideally, the frequency of the oscillating signal component 50 is determined by the values of inductor 34 and parasitic capacitor 44 of effective circuit 40 at the switch instant. The change in value of parasitic inductance and capacitance is negligible with temperature. Thus, the frequency of oscillation does not show significant temperature dependence. The damping factor or shape of the envelope of the decaying oscillating signal component 50 is determined by resistors 43, 45, 46. Operating point resistor 46 typically represents dissipation which is a function of temperature. Thus, a change in dissipation due to a change in temperature causes a change in the damping factor. Due to the change in damping factor, the envelope of the decaying oscillating signal also changes. If the dissipation increases, the oscillations in the oscillating signal decay at a faster rate and vice versa. Thus, if the temperature changes, the amplitudes of the peaks in the oscillating signal also change for a given energy level.

Oscillating signals corresponding to either turn-on or turn-off switch instants may be used. Oscillating signals resulting at a turn-on switch instant are more convenient to use because the exact turn-on switch instants can be known in advance. Moreover, the turn-on switch instants generally are closely spaced allowing for exclusive extraction of ringing content corresponding to turn-on switch instants and removal of ringing content corresponding to turn-off switch instants.

Because the signals from different modules are available on the same bus (either input or output), the oscillating signal corresponding to each power converter module should be differentiated from the others to determine the temperature associated with a specific power converter module. If the switching cycle of the power converter modules 26A, 26B, . . . , 26N are interleaved and the commutation sequence is predetermined, successive modules fire at successively delayed times. For additional information relating to interleaving of switching cycles, see M. T. Zhang, et al., IEEE Transactions on Power Electronics, Vol. 13, No. 4, July 1998, pp. 690-698. Assuming that the commutation sequence is fixed and known, the switch instant for each power converter module can be used to synchronize an oscillating signal with a specific converter module. Thus, a turn-on signal can be isolated to a specific converter module using a timing circuit.

The bus voltage is a slowly varying signal. For a DC input bus, it is constant. For an AC input bus, it may vary at a frequency of up to a few hundred Hz. To extract the oscillating signal, the bus voltage is decoupled. Filtering of the bus voltage, decouples the bus voltage and extracts the oscillating signal. Using an experimental set-up, the frequency of the oscillating signal was ~7 megahertz (MHz). The oscillating signal changes with the duty ratio, which can have a bandwidth of up to 2 kHz. The switching frequency may be 10's of kHz. Thus, the signal can be modeled as a slow envelope of duty ratio variation multiplied by the high frequency oscillating signal with the AC or DC bus voltage added to it. In an exemplary embodiment, a high pass filter having a cutoff frequency of 1 kHz removes the nominal bus voltage component (0 for DC, 50-60 Hz for AC voltage).

The duty ratio is controlled through modification of the switch-on and/or switch-off times at each power converter module, and thus, governs the average power flow. The power flow determines the difference between the states to which the device is subjected at a switching instant. When the switch is off, the voltage across the device is large and determined by the duty ratio and the topology of the device. When the switch is on, the voltage drop is determined by the device characteristics and is typically small. This difference between the on-state and the off-state voltage is the excitation which drives the effective LCR circuit of FIG. 3 and produces the ringing phenomenon. Equivalently, during the off-state, the parasitic capacitor is charged to a large value and is discharged during turn-on to the on-state voltage drop value. Because the voltage drop is a function of duty ratio and the duty ratio is the manipulated input, the amplitude of the oscillating signal is a function of both duty ratio and temperature. Direct measurement of duty ratio requires the identification of turn-on switch instants and turn-off switch instants. Because the duty ratio can potentially vary through manipulation by the load controller 28, the time at which the power converter modules turns off generally is not known a priori. Measuring of duty ratio is therefore difficult.

Several methods can be used to estimate the temperature information from the oscillating signal. The temperature information of the oscillating signal is included in the damping factor. Estimation of the damping factor without measuring duty ratio can be performed based on a ratio of peak voltages measured in the ringing signal. For example, a ratio of consecutive peaks (both positive, both negative, or one peak positive and one peak negative) provides the damping information of an exponentially decaying oscillating signal. The measurement of one peak positive and one peak negative is easier as compared to consecutive positive or negative peaks because opposed peaks can be measured using two separate peak detector circuits, whereas, measurement of consecutive peaks requires more complex circuitry. Additionally, based on the LCR model, the damping factor is independent of duty ratio. Thus, two options for estimation of temperature related information from the oscillating signal exist without measuring duty ratio. In a first exemplary embodiment, the dependence on duty ratio can be decoupled from the decay of the oscillating signal component to estimate the temperature. In a second exemplary embodiment, the damping factor can be directly estimated from a complex exponential and used to estimate the temperature. In a third exemplary embodiment, a curve may be fit to the oscillating signal and the damping factor determined. Multiple methods exist for performing each of these options.

Figure 5:
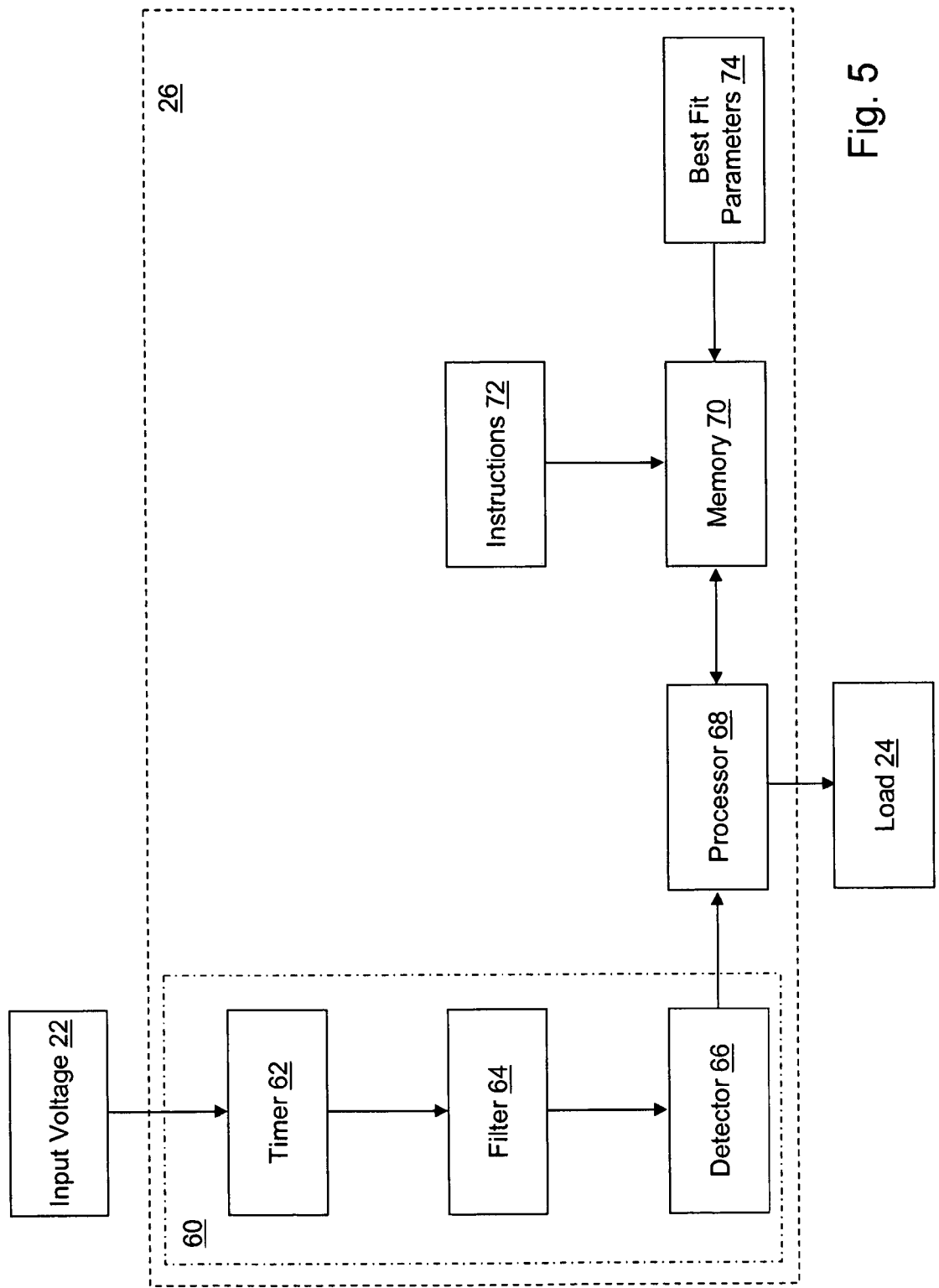
FIG. 5 is a block diagram of a power converter module of the paralleled power converter of FIG. 1 in accordance with an exemplary embodiment.
Figure 6:
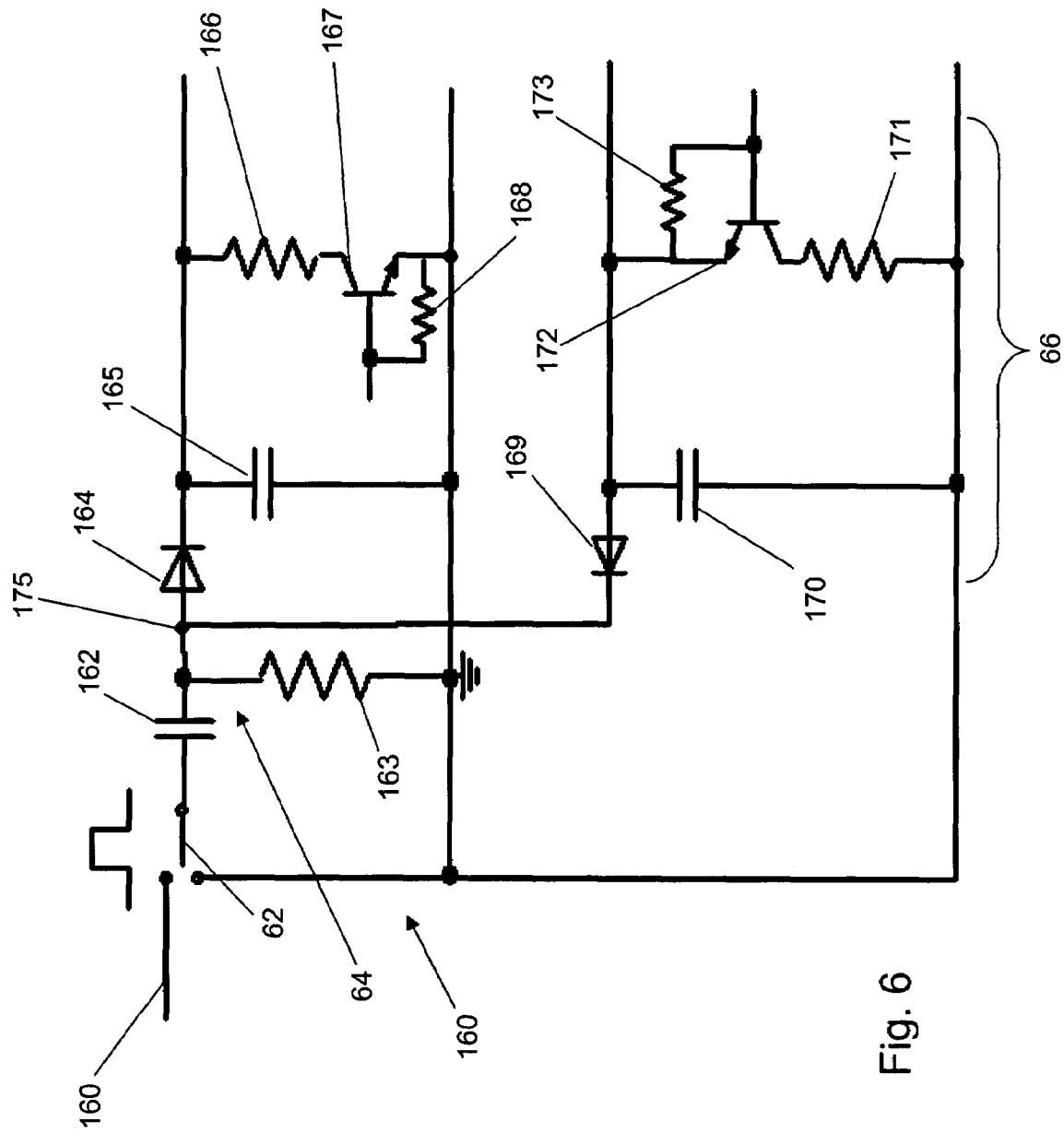
FIG. 6 is a circuit diagram of an interface circuit of the power converter module of FIG. 5.

With reference to FIG. 5, an exemplary block diagram of a power converter module 26 is shown. The power converter module 26 may include an interface circuit 60, a processor 68, a memory 70, instructions 72, and best-fit parameters 74. Interface circuit 60 may include a timer 62, a filter 64, and a detector 66. With reference to FIG. 6, an exemplary interface circuit 160 decouples the bus voltage signal 161 and isolates the turn-on signal switch instant. Interface circuit 160 includes a first capacitor 162 and a first resistor 163 that form high pass filter 64. For example, first capacitor 162 may be an electrolytic capacitor having a 0.1 microfarad (μF) capacitance and first resistor 163 may have a one kiloohm (kΩ) resistance. High pass filter 64 decouples the bus voltage from the oscillating signal and outputs a signal that includes a zero offset high frequency oscillating signal. The cut-off frequency of high pass filter 64, for example, may be one kHz, which is about 4000 times less than the dominant ringing frequency. At this cut-off frequency, the distortion is expected to be about 0.01%, which corresponds to less than a degree Celsius error and is within an acceptable limit.

The input signal 175 at the diode junction has ringing corresponding to both turn-on and turn-off switch instants of the bus voltage signal 161. Because the ringing lasts only for a few tenths of a percent of the switching period, the turn-on and turn-off signals are well separated in time unless the duty ratio is less than ~1%. Timer 62 provides a timing means that removes the oscillating signal resulting at a turn-off switch instant. Using exemplary interface circuit 160, an analog multiplexer, for example, IC ACJ 6301, can appropriately turn-on and turn-off to remove the portion of the oscillating signal resulting from the turn-off switch instant. The switching signal for the analog multiplexer can be generated by delaying the converter module pulse width modulator, for example, using two cascaded 555 timer circuits operating in mono-stable mode. Instead of an analog multiplexer, a transistor can be used.

There are alternatives for isolating switch instants as known to those skilled in the art both now and in the future. For example, a switch may be used (i.e., a bipolar junction transistor switch or MOSFET-based switch). Additionally, an analog multiplexer that is synchronously controlled to pass the signal for a certain duration and block the signal for another duration may be used.

Positive and/or negative peak amplitudes of the ringing signal can be determined using peak detector circuit 66 in an exemplary embodiment. Peak detector circuit 66 provides a detecting means for detecting a characteristic of the oscillating signal component after the isolated switch instant. Single or multiple peak voltages may be detected. In an exemplary embodiment, a first peak detector circuit isolates a positive peak and a second peak detector circuit isolates a negative peak. A peak detector circuit may include a diode rectifier circuit with an output capacitor. Shown with reference to FIG. 6, a first peak detector circuit includes a first diode 164 and a first peak detector capacitor 165. A second peak detector circuit includes a second diode 169 and a second peak detector capacitor 170. In an exemplary embodiment, first diode 164 and second diode 169 are signal diodes of type 1N3600 and first peak detector capacitor 165 and second peak detector capacitor 170 are electrolytic capacitors having a 0.1 μF capacitance. The voltages across first peak detector capacitor 165 and second peak detector capacitor 170 correspond to peak voltages in the filtered ringing signal. Additional detection methods may be used as known to those skilled in the art both now and in the future. For example, signal processing of the oscillating signal at a switching instant may be used. Additionally, the oscillating signal may be rectified, passed through a low pass filter, and sampled and held until the next ringing signal arrives.

To ensure sufficient bandwidth, first peak detector capacitor 165 and second peak detector capacitor 170 may be periodically partially discharged through a first transistor switching circuit and a second transistor switching circuit, respectively. The first transistor switching circuit includes a first discharge resistor 166, a first transistor 167, and a second discharge resistor 168 in an exemplary embodiment. The second transistor switching circuit includes a third discharge resistor 171, a second transistor 172, and a fourth discharge resistor 173 in an exemplary embodiment. First discharge resistor 166 and third discharge resistor 171 each have a one megaΩ (MΩ) resistance, and second discharge resistor 168 and fourth discharge resistor 173 each have a five kΩ resistance. Second discharge resistor 168 and fourth discharge resistor 173 ensure that the first transistor 167 and the second transistor 172, respectively, are properly biased and operate in the saturation region of each. First transistor 167 and second transistor 172 may be bipolar junction transistors of the type SL100. Such an arrangement of detection circuits ensures that, if successive peaks are lower, as in the case of increasing temperature and constant duty ratio, the system responds appropriately to the change.

Using exemplary interface circuit 160 in a test set-up, the discharge was performed with a frequency of 20 Hz to satisfy a bandwidth requirement for the temperature estimation to be effective as a sensor. The time for discharge via first transistor 167 and second transistor 172 was 0.1 milliseconds (ms). The time constant in the discharge circuit was 0.2 seconds, which is about 500 times the time period between successive turn-on switch instants. Therefore, only a small change in peak voltage occurs due to the discharge process. This change is sufficient to remove the temperature information while not removing the duty ratio (D) or the off state voltage ($V_o$) dependence. Various level shifting and DC offsets were added to overcome implementation problems. The discharging ensures that a sample of temperature information is taken periodically for a certain number of switching cycles. For example, the discharging may be performed every 100 switching cycles. The parasitic leakage resistances of the output capacitances ensure that, during peak detection, some amount of averaging takes place over the cycle period and that the resultant output is a function of the ringing over the cycle period. These leakage and discharging processes are designed to ensure sufficient bandwidth for sensing of the temperature.

Using an averaged model, the off state ($V_o$) is dependent on the duty ratio (D) and the input voltage 22 ($V_{in}$) as shown in equation (2) below:

$$V_o = V_{in}/(1-D) \quad (2)$$

The amplitude of the ringing at a constant temperature is proportional to the output voltage minus the on state device voltage drop as represented by equations (3) and (4), below. The subscript + or − denotes the peak in positive or negative half cycle.

$$v_+ \alpha 1/(1-D) \quad (3)$$

$$v_- \alpha 1/(1-D) \quad (4)$$

$v_+$ is the peak positive voltage, and $v_-$ is the peak negative voltage.

A slope, $m_\pm$, of $v_\pm$-T curves as a function of duty ratio ideally should follow the form $H_\pm e^{-\sigma t} \cos(\omega t + \phi)$, where $t = n\pi/\omega_0$ for n=1, 2, . . . As a first order approximation for σ as a function of temperature, the envelope follows the curve $H_\pm(1-(\alpha T+\beta)t)$ because the system is under damped, and σt is small for the first few peaks. The $v_\pm$-T plot thus has a slope $m_\pm$, of $-H_\pm \alpha t$ and an intercept $b_\pm$, of $H_\pm(1-\beta t)$ as a first order approximation. Experimentally it has been verified that the dominant resonant frequency does not change significantly due to a change in the duty ratio or temperature.

The intercept points, $b_\pm$, ($v_{+|T}=0°$ C. or $v_{-|T}=0°$ C.) as a function of D can be fit with a curve of the form $C_\pm/(1-D)+E_\pm$ where $C_\pm$ and $E_\pm$ are best-fit parameters. The constant term $E_\pm$ is added to account for DC offsets and for better convergence using curve fitting software. Under the first order approximation, the intercept is a linear function of 1/(1−D). Consequently, H is a linear function of 1/(1−D). Thus, the slopes $m_\pm$, also have a linear relationship with 1/(1−D). Therefore, the $m_\pm$-D points can be fit with curves of the form $A_\pm/(1-D)+B_\pm$. The previous equations involving D can also be represented in terms of the off state voltage $V_o$ as indicated in equation (2). Based on the boost converter example, the factor of 1/(1−D) in the equations is replaced by $V_o$.

Combining the best-fit curves for the slope and the intercepts of $v_+$ and $v_-$ results in equations (5)-(9) where elimination of 1/(1−D) using (5)-(8) yields a quadratic equation in T as shown in (9).

$$v_+ = m_+ T + b_+ \quad (5)$$

$$v_- = m_- T + b_- \quad (6)$$

$$v_+ = (A_+/(1-D)+B_+)T + C_+/(1-D) + E_+ \quad (7)$$

$$v_- = (A_-/(1-D)+B_-)T + C_-/(1-D) + E_- \quad (8)$$

$$(B_+A_- - B_-A_+)T^2 + (E_+A_- - A_+E_- + B_+C_- - C_+B_- - v_+A_- + v_-A_+)T + E_+C_- - C_+E_- + v_-C_+ - v_+C_- = 0 \quad (9)$$

The quadratic equation of (9) can be solved to obtain the estimate of the temperature. Thus, given the measured values of $v_+$ and $v_-$, identically weighted and averaged over time, the temperature can be estimated from the oscillating signal available on the common bus. The quadratic equation calculations can be executed in software. The coefficients of the quadratic equation in (9), $A_+$, $A_-$, $B_1$, $B_-$, $C_+$, $C_-$, $E_+$, and $E_-$, are best-fit parameters. The best-fit parameters can be obtained by curve fitting values of $v_+$ and $v_-$ as a function of T and D or as a function of T and $V_o$. Either of the fitting parameters D or $V_o$ can be used.

In alternative embodiments, other peak voltages may be used. For example, two peak positive voltages or two peak negative voltages may be used. Thus, the best-fit parameters 74 may be more generally denoted as $A_1$, $A_2$, $B_1$, $B_2$, $C_1$, $C_2$, $E_1$, and $E_2$. The quadratic equation after substitution of $v_+$ and $v_-$ and best-fit parameters $A_1$, $A_2$, $B_1$, $B_2$, $C_1$, $C_2$, $E_1$, and $E_2$ is solved to obtain an estimate of the temperature. Thus, given the measured values of $v_+$ and $v_-$ (or other peak voltages)

weighted and averaged over time, the temperature can be estimated from the oscillating signal available on the common bus.

With reference to the second exemplary embodiment, the damping factor can be directly estimated from a complex exponential. The off-state voltage across the device, which has a one-to-one relationship with the duty ratio as shown in equation (2), primarily determines the ringing amplitude. Thus, as long as the converter is operating in the conduction region, the off-state voltage also can be used to determine the ringing amplitude. Each module may operate at a different duty ratio, but have the same off-state voltage drop across the device. Under these conditions, equations (2), (3), and (4) do not hold. Instead, the factor of 1/(1−D) in equations (3)-(9) is replaced by the off-state voltage, $V_o$, and the constants are modified as shown in equations (10) and (11) below.

$$v_+ = (F_+ V_o + B_+)T + G_+ V_o + E_+ \qquad (10)$$

$$v_- = (F_- V_o + B_-)T + G_- V_o + E_- \qquad (11)$$

Thus, best-fit parameters 74 also include $F_1$, $B_1$, $G_1$, and $E_1$, and/or $F_2$, $B_2$, $G_2$, and $E_2$. Either of equations (10) or (11) also can be solved to obtain the estimate of the temperature given a measured value of $V_o$ and of $v_+$ or $v_-$ and one of the best-fit parameters $F_1$, $B_1$, $G_1$, and $E_1$, or $F_2$, $B_2$, $G_2$, and $E_2$. Thus, solving of a quadratic equation that can produce complex results is not required. The calculations can be executed in software. The best-fit parameters can be obtained by curve fitting values of $v_+$ and/or $v_-$ as a function of T and $V_o$. Only a single peak detection circuit is needed that can detect either a positive peak voltage or a negative peak voltage or the information from both measurements can be combined. Any particular peak or combination of peak voltages can be used with reference to equations (10) or (11). Ideally, $B_1$, $B_2$, $E_1$, and $E_2$ are zero. The presence of a diode voltage drop, a non-zero on-state voltage drop, and/or sensor interface DC offsets, may make $B_1$, $B_2$, $E_1$, and $E_2$ non zero, however.

Figure 7:
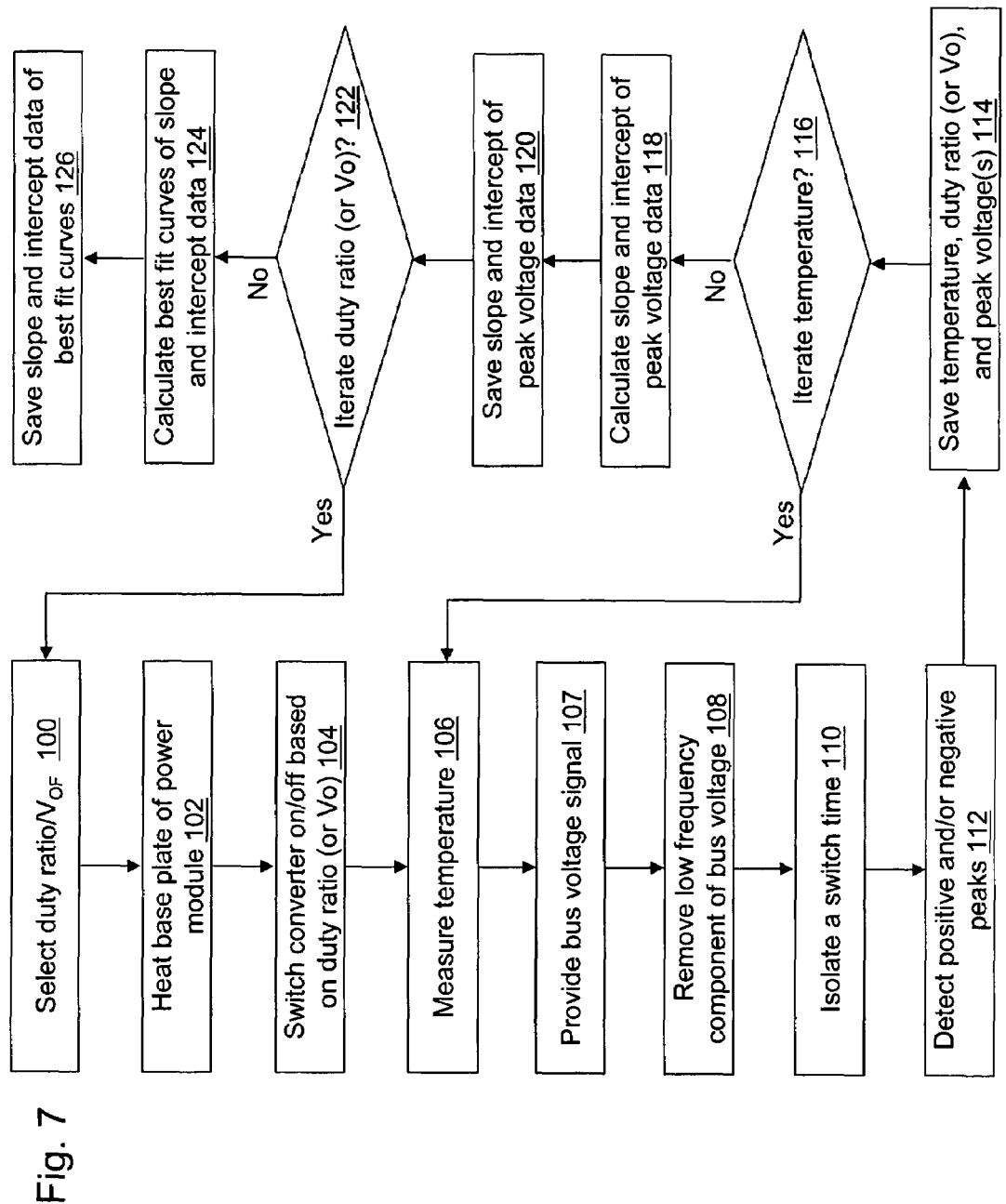
FIG. 7 is a flow diagram illustrating exemplary operations performed at the power converter module of FIG. 5 to calculate best-fit parameters in accordance with an exemplary embodiment.

With reference to FIG. 7, exemplary operations performed to determine best-fit parameters 74 are described. In an operation 100, a duty ratio is selected from a range of duty ratios over which the power converter module is expected to operate. Alternatively, in an operation 100, an off-state voltage, $V_o$, is selected. In an operation 102, the base plate of the power converter module 26 is heated. For more accurate results, the junction temperature should be measured. It is, however, not feasible to measure the junction temperature by direct means. Therefore, the base plate temperature can be used as an approximation for the junction temperature. The heat flows from base plate to junction, and the dynamics of the base plate determine the heat flow, and consequently the temperature, of the junction. Because the base plate thermal dynamic bandwidth is much smaller than the bandwidth associated with junction dynamics, the junction dynamics are limited by the base plate bandwidth, and thus, vary slowly. Thus, the relationships obtained for base plate temperature measurement are expected to hold true for junction temperature. To measure the base plate temperature, a J type copper-constantan thermocouple can be used with an IC AD594, or similar device, for noise reduction and to provide an absolute cold junction reference and amplification of the weak thermocouple signal. The thermocouple is attached to the base plate and setup to measure the base plate temperature.

In an operation 104, the power converter module 26 is switched on and off based on the selected duty ratio (or $V_o$). In an operation 106, a temperature of the base plate is measured. During the best-fit parameter calculation process, the base plate is allowed to cool from an initial temperature to define a temperature range. As a result, for each successive iteration, the temperature cools. In an operation 107, the bus voltage signal is provided at the power converter module interface circuit 60. In an operation 108, the low frequency component of the bus voltage signal is removed, for example, using high pass filter 64. In an operation 110, a switch instant is isolated, for example, using timer 62 to isolate a turn-on switch instant and to remove the turn-off switch instant oscillations. The switch instant may correspond to any power converter module 26A, 26B, . . . , 26N within paralleled power converter 20. Assuming that the commutation sequence is fixed and known and that the switching cycles of each power converter module are interleaved, the switch instant for each power converter module can be used to synchronize the oscillating signal with a specific converter module.

In an operation 112, one or more voltage peaks are detected, for example, using peak detector 66. In an exemplary embodiment, a first positive and/or a first negative peak are measured immediately following the isolated switch instant. For example, as shown with reference to FIG. 4, the first positive peak voltage 54 and/or the first negative peak voltage 56 are detected. In an operation 114, the measured temperature, selected duty ratio (or $V_o$) and detected peak voltage(s) are saved. For example, the power converter module can be connected to an oscilloscope to save the data.

In an operation 116, a determination is made concerning whether or not to iterate over another temperature. If another temperature iteration is to be performed, processing continues at operation 106 to measure the current temperature of the power converter module 26. If another temperature iteration is not to be performed, a slope and an intercept are calculated for a curve fitting the negative peak voltage data points and/or the positive peak voltage data points for each measured temperature at the selected duty ratio (or $V_o$).

Figure 9:
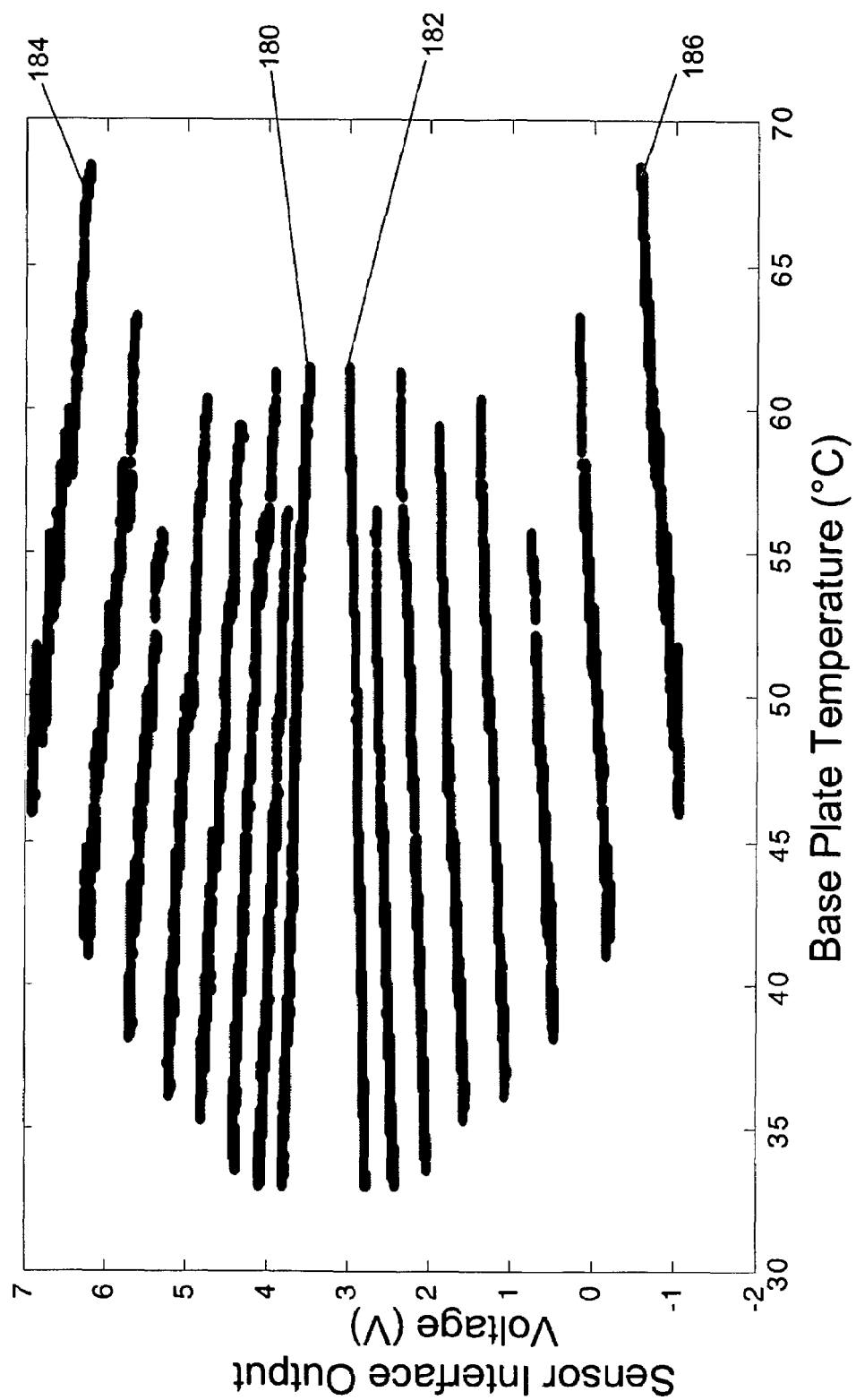
FIG. 9 is a graph illustrating an output voltage of the interface circuit of FIG. 6 over a range of temperatures and duty ratios in accordance with an exemplary embodiment.

With reference to FIG. 9, the data point for each measured temperature at a selected duty ratio is shown for an exemplary experiment. The data points include the DC offsets used in the circuit for signal processing, and thus, are not symmetric about zero. First curve 180 indicates the first positive peak voltage 54 as a function of the measured temperature at a duty ratio of 25%. Second curve 182 indicates the first negative peak voltage 56 as a function of the measured temperature at a duty ratio of 25%. Third curve 186 indicates the first positive peak voltage 54 as a function of the measured temperature at a duty ratio of 65%. Fourth curve 188 indicates the first negative peak voltage 56 as a function of the measured temperature at a duty ratio of 65%. Each data point on the curve may be averaged over twenty temperature samples. Thus, twenty samples were taken at each temperature and averaged before being saved in operation 114. The v-T curves, as shown with reference to FIG. 9, are nearly straight lines for both positive and negative peak voltage amplitudes for a selected duty ratio. As a result, the data points can be fit with straight lines using curve fitting algorithms, as known to those skilled in the art, resulting in a slope and an intercept for each curve 180, 182, 184, 186. The DC offsets can be accounted for in the curve fitting of the intercepts for each curve 180, 182, 184, 186. The slope and intercept, for example, can be estimated using best-fit least squares error computation methods implemented in MATLAB. In an operation 120, the slope and intercept data calculated for each peak voltage curve are saved.

Figure 10:
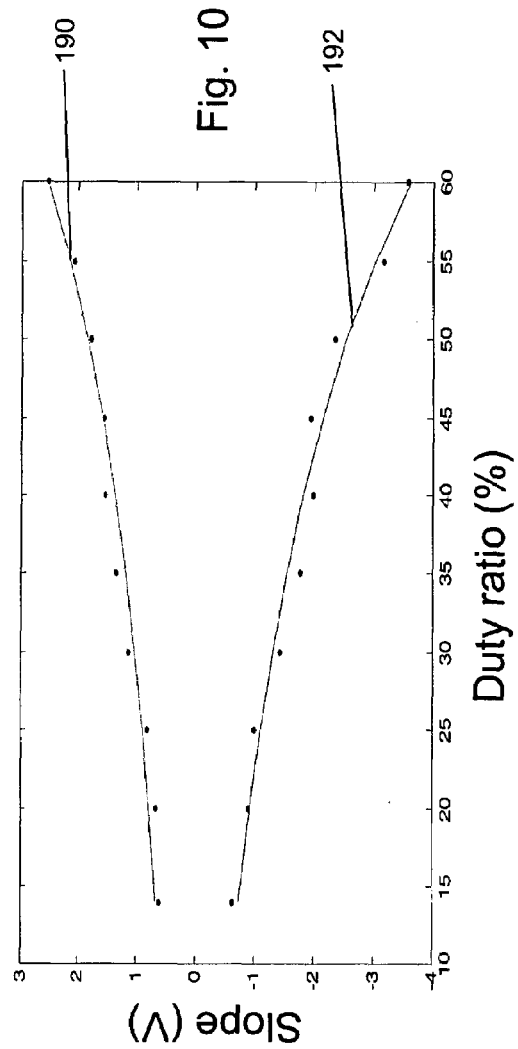
FIG. 10 is a graph illustrating a slope of each duty ratio curve of FIG. 10 over a range of duty ratios in accordance with an exemplary embodiment.
Figure 11:
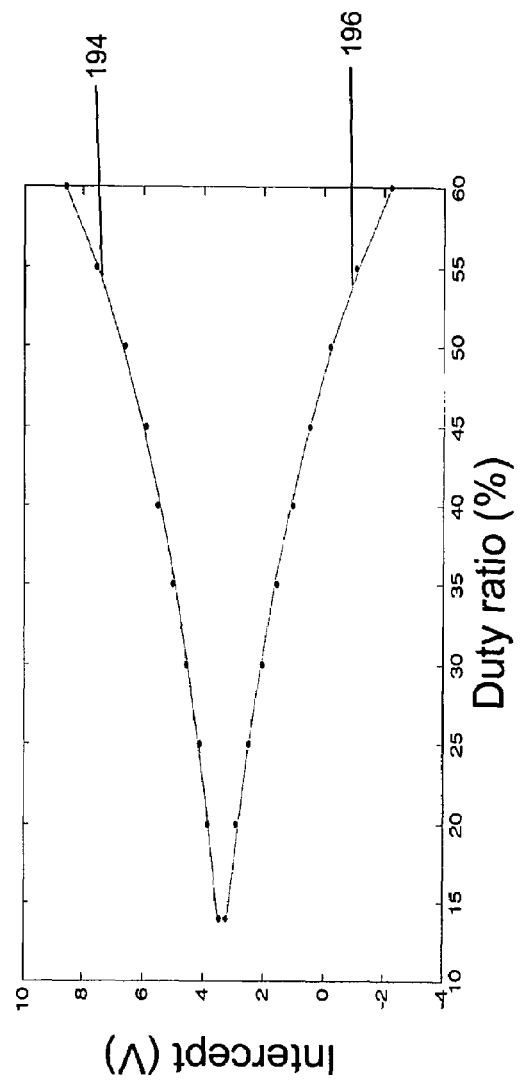
FIG. 11 is a graph illustrating an intercept of each duty ratio curve of FIG. 10 over a range of duty ratios in accordance with an exemplary embodiment.

In an operation 122, a determination is made concerning whether or not to iterate over another duty ratio (or $V_o$). If another duty ratio (or $V_o$) iteration is to be performed, processing continues at operation 100 to select the next duty ratio (or $V_o$) for the power converter module 26. If another duty ratio (or $V_o$) iteration is not to be performed, a slope and an intercept are calculated for curves fitting both the slope and the intercept data points for the peak positive and/or the peak negative voltages as a function of the selected duty ratio (or $V_o$). With reference to FIG. 10, the slope data point for each selected duty ratio is shown for the exemplary experiment. First slope curve 190 indicates the slope of the curve fitting the first positive peak voltage v-T data curve of FIG. 9 as a function of the selected duty ratio. Second slope curve 192 indicates the slope of the curve fitting the first negative peak voltage v-T data curve of FIG. 9 as a function of the selected duty ratio. With reference to FIG. 11, the intercept data point for each selected duty ratio is shown for the exemplary experiment. First intercept curve 194 indicates the intercept of the curve fitting the first positive peak voltage v-T data curve of FIG. 9 as a function of the selected duty ratio. Second intercept curve 196 indicates the intercept of the curve fitting the first negative peak voltage v-T data curve of FIG. 9 as a function of the selected duty ratio. The data points can be fit with curves using curve fitting algorithms as known to those skilled in the art.

The data points in the curves 190, 192, 194, 196 can be fit with curves linear in $1/(1-D)$ (or $V_o$). This process can be carried out using GNUPLOT, for example. Alternatively, the duty ratio points can be transformed and a linear curve fit to the transformed data, for example, using MATLAB software or any other relevant software. Using a straight line curve fitting algorithm, a slope and an intercept for each curve is calculated. The slope and intercept of first slope curve 190 provides best-fit parameters $A_1$ and $B_1$. The slope and intercept of second slope curve 192 provides best-fit parameters $A_2$ and $B_2$. The slope and intercept of first intercept curve 194 provides best-fit parameters $C_1$ and $E_1$. The slope and intercept of second intercept curve 196 provides best-fit parameters $C_2$ and $E_2$. In an operation 126, the slope and intercept data calculated for each curve 190, 192, 194, 196 are saved as best-fit parameters 74. As known to those skilled in the art both now and in the future, additional curve fitting algorithms may be used.

Figure 8:
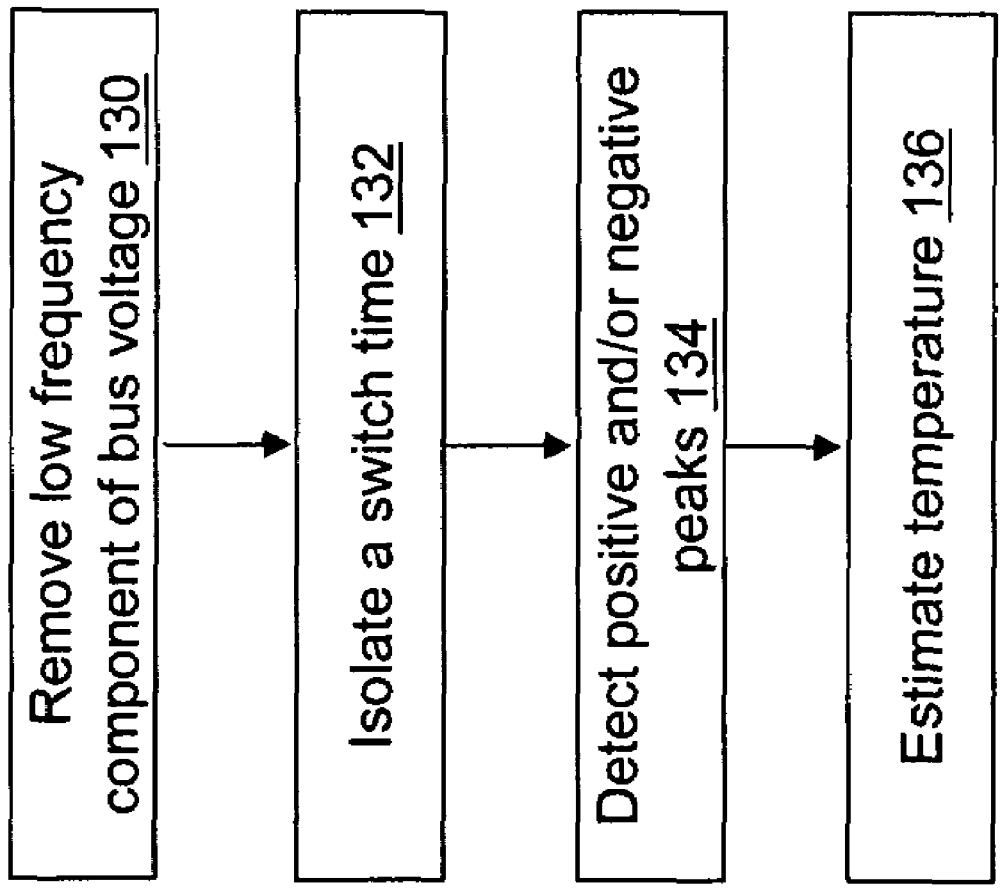
FIG. 8 is a flow diagram illustrating exemplary operations performed at the power converter module of FIG. 5 to estimate a power converter module temperature in accordance with an exemplary embodiment.

After a determination of best-fit parameters 74 for the quadratic equation (9), equation (10), and/or equation (11), a temperature can be estimated using detected peak positive and/or peak negative voltages. With reference to FIG. 8, exemplary operations performed to estimate a temperature of a power converter module are described. In an operation 130, the low frequency component of the bus voltage signal is removed, for example, using filter 64. In an operation 132, a switch instant is isolated, for example, using timer 62 to isolate a turn-on switch instant thereby removing oscillations occurring at the turn-off switch instant. The switch instant may correspond to any power converter module 26A, 26B, . . . , 26N within paralleled power converter 20. In an operation 134, one or more peak voltages are detected, for example, using detector 66. In an operation 136, a temperature is estimated using the detected peak positive and/or peak negative voltage values, best-fit parameters 74, and quadratic equation (9), equation (10), and/or equation (11). Preferably, the peak positive voltage and/or peak negative voltage are weighted and averaged over time before estimating the temperature.

Figure 12:
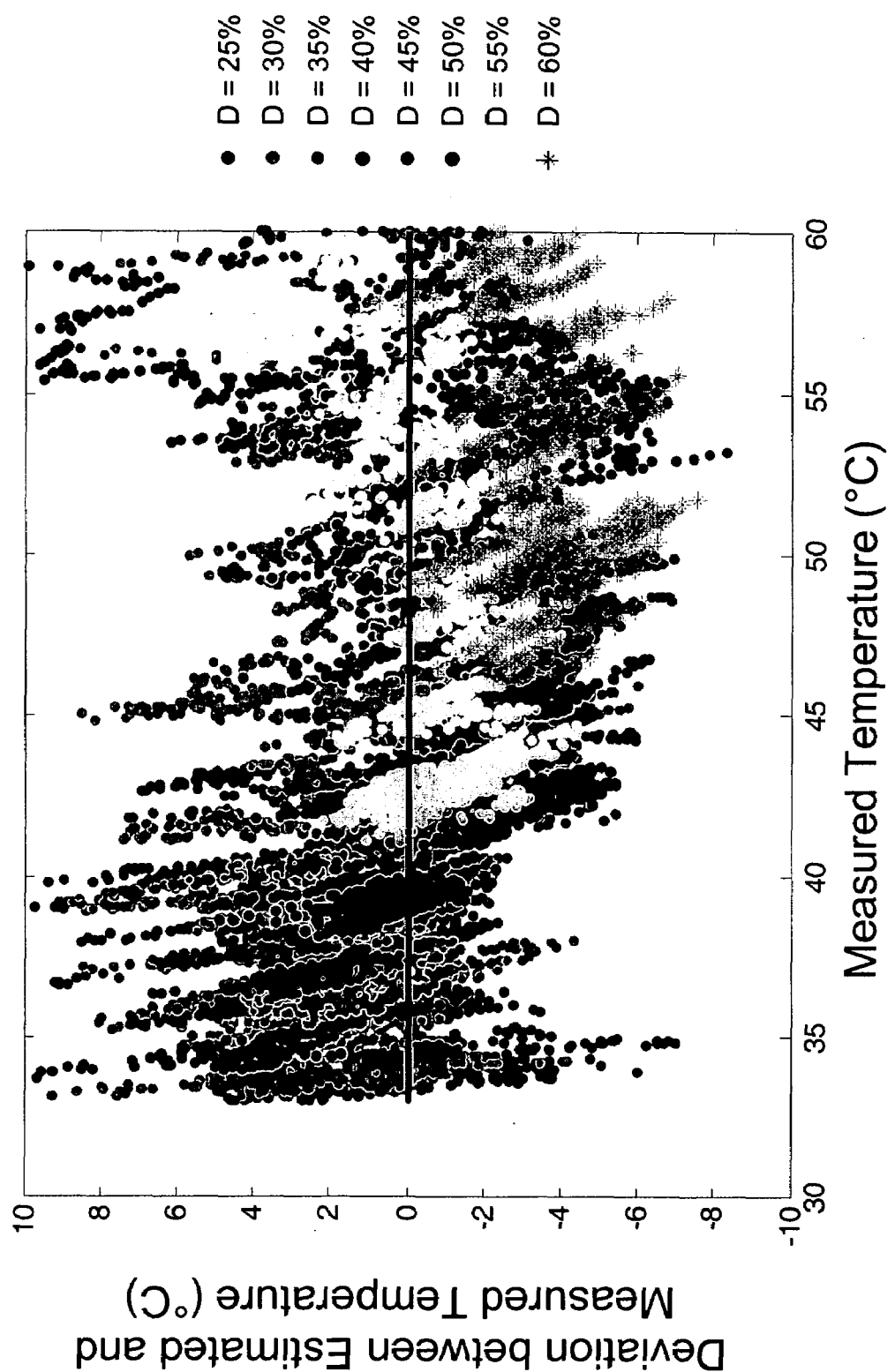
FIG. 12 is a scatter plot illustrating a comparison between an estimated temperature and a measured temperature in accordance with a first exemplary embodiment.

With reference to FIG. 12, a scatter plot of the deviation between a measured temperature at the base plate of the power converter module and a temperature estimated using the process of FIG. 8 and quadratic equation (9) is shown. Statistically, the standard deviation of the difference between the estimated and the measured temperature is 3.5° C. This is within an acceptable limit for implementation of thermal based load sharing management. The experimental results depicted in FIG. 12 were conducted for duty ratios in the range of 25% to 60%. The results over the range of duty ratios from 25% to 60% were consistent. At low duty ratios, the amount of current is very small resulting in negligible losses and correspondingly little heating of the device. Hence, low losses are not a problem using relative temperature control.

The key variable that determines the ringing amplitude is the off state voltage drop. The off state voltage drop is dependent on the duty ratio. For the experimental setup, the system was operated and the methodology verified for a certain off state voltage range consistent with the design of the system. Below a minimum level of the off state voltage, the device current was too small, and the modeling was no longer applicable. This condition corresponded to a duty ratio of 25%. Above 60% duty ratio, the current level was too high for the input power source to handle. As a result, the experimental results are limited to this range. There is nothing, however, that restricts this methodology to a certain duty ratio range. The design specification of the system limited the operation of the system.

In analyzing the results, the linearized model for the slope results in some deviation from the best-fit curves. Higher order polynomials may be fitted to the slope, $m_\pm$, data points. Elimination of the duty ratio term from the expressions for $v_+$ and $v_-$, however, becomes difficult and subsequently solving the expression for T for a higher order polynomial becomes computationally very expensive for implementation using simple analog circuits. The intercept points, $b_\pm$, on the other hand, are not sensitive to curve fitting problems. The intercept points fit the curve to within a few percent relative error. Additionally, all of the values for the intercept points are fairly large, and thus, are generally immune to errors.

Figure 13:
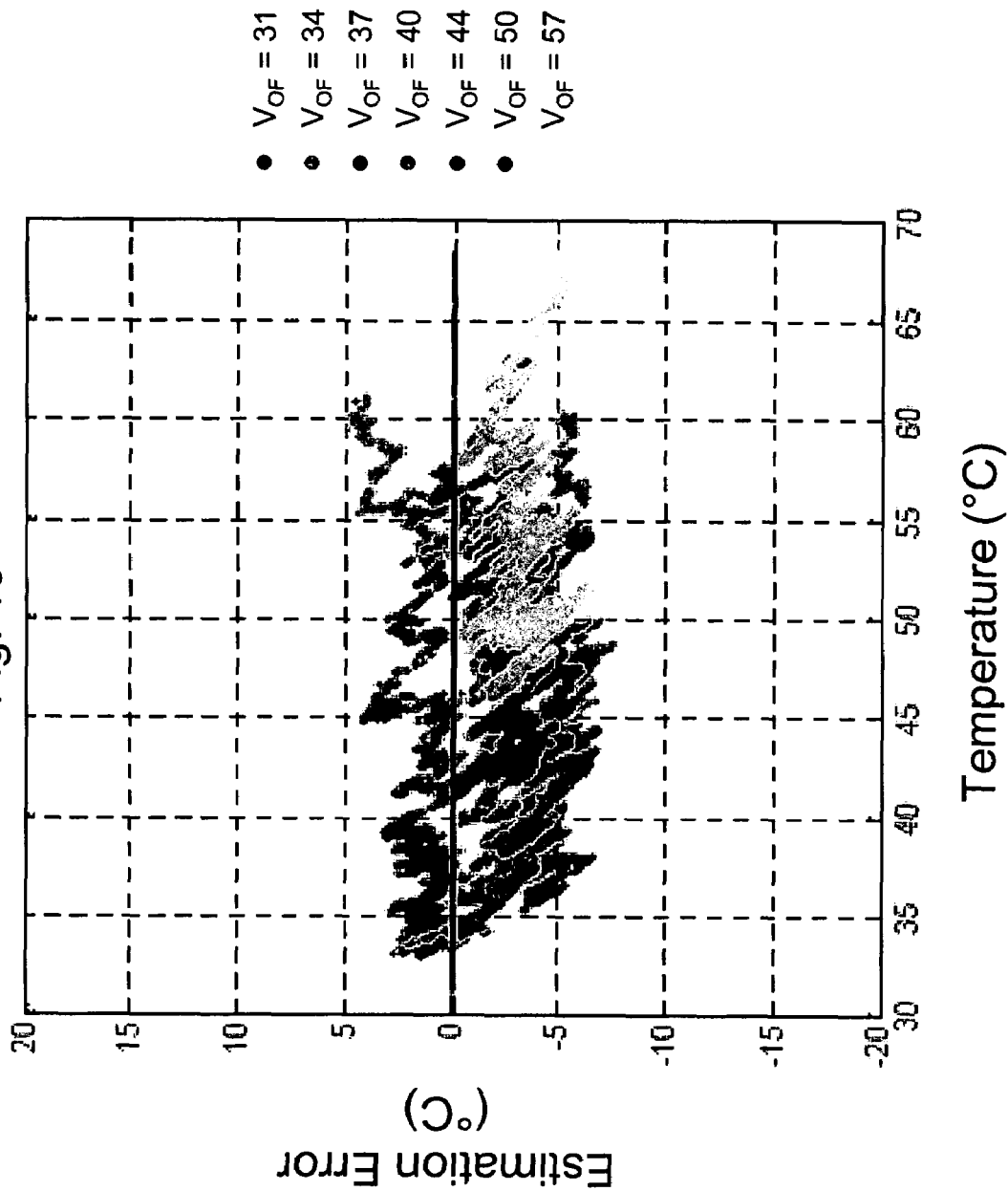
FIG. 13 is a scatter plot illustrating a comparison between an estimated temperature and a measured temperature in accordance with a second exemplary embodiment.

With reference to FIG. 13, a scatter plot of a temperature estimation error for a measured temperature at the base plate of the power converter module for different off-state voltage drops using the process of FIG. 8 and equation (10) is shown. The standard deviation is about 2.2° C. This also is within an acceptable limit for implementation of thermal based load sharing management. Use of quadratic equation (10) and/or equation (11) has a number of advantages over use of quadratic equation (9). First, solving of a quadratic equation with possible complex results is not required. Second, when converters are paralleled with a common source and a common load, the off-state voltage drop is likely to be constant across modules and hence, can be easily compared to the duty ratio, which generally is different for different modules. Third, only a single peak detection circuit is needed that can detect either a positive peak voltage or a negative peak voltage or the information from both measurements can be combined. Any particular peak or combination of peak voltages can be used.

With reference to the third exemplary embodiment, a curve is fit to oscillating signal characteristic data averaged over some number of switching periods. Complex exponential estimation techniques are well established and are widely used in industry for studying structural resonances and modal model analysis. Exemplary methods include the complex exponential method, the Hilbert envelope method, the Ibrahim time domain method, the rational fraction polynomial method, etc. Curve fitting, however, is computationally expensive and exponentially decaying curves are difficult to converge in linear space though such curves are easier to converge using logarithmic space based algorithms. As a result, these methods generally are not designed to work in real time.

Other methods may be used to estimate the temperature from the peak voltage data points. For example, neural networks or support vector machines may be used to estimate the temperature from the peak voltage data points including structured neural networks and artificial neural networks. Neural networks are computational structures that can be trained to map certain inputs to certain outputs. Artificial neural networks do not need the knowledge of any model, but may take a long time to train. Additionally, the number of computational structures or nodes is large. Structured neural networks on the other hand require fewer nodes and less training time. However, they require accurate physical modeling of the system.

The temperature information for each power converter module 26A, 26B, . . . 26N is available in every other power converter module. As a result, the functionality of the processor may be implemented in each module obviating the need for a central processor and the extra cables to connect the central processor with each power converter module 26. Thus, each power converter module 26 may include processor 68. Processor 68 provides a processing means for executing instructions that may be written using one or more programming language, scripting language, assembly language, etc. The instructions may be carried out by a special purpose computer, logic circuits, or hardware circuits. Thus, processor 68 may be implemented in hardware, firmware, software, or any combination of these methods. The term "execution" is the process of running an application or the carrying out of the operation called for by an instruction. Processor 68 executes instructions 72 that for example include the operations described with reference to FIG. 7 and/or FIG. 8 and/or other instructions. Power converter module 26 may include one or more processor 68 that uses the same or a different processing technology. Processor 68 and memory 70 may be separate components of power converter module 26 or may be embedded within another component of power converter module 26. For example, processor 68 and memory 70 may be implemented using an application specific integrated circuit.

Instructions 72 are an organized set of instructions that, when executed, cause power converter module 26 to calculate best-fit parameters 74 or to estimate a temperature at any of the power converter modules 26A, 26B, . . . , 26N. Instructions 72 may be written using one or more programming language, assembly language, scripting language, etc.

Memory 70 may store instructions 72 and best-fit parameters 74 in addition to other information. Power converter module 26 may have one or more memory 70 that uses the same or a different memory technology. Memory technologies include, but are not limited to, random access memory, read only memory, flash memory, etc.

The estimated temperature at each power converter module 26 can be used to support thermal load management of power converter 20. For example, a thermal load management controller may implement a virtual heat sink electronically at each power converter module 26. The virtual heat sink emulates a common heat sink on which all of the power converter modules have been mounted. It provides a common reference to all of the power converter modules relative to which the modules control their temperature by controlling the current which in turn controls the power losses and heating. The temperature of the virtual heat sink can change depending on the load to support heavier transient loads.

The foregoing description of exemplary embodiments of the invention have been presented for purposes of illustration and of description. It is not intended to be exhaustive or to limit the invention to the precise form disclosed. Modifications and variations are possible in light of the above teachings or may be acquired from practice of the invention. Additional circuits and/or instructions may be added to improve the signal quality, integrated chips may be used to perform multiple or all functions together, etc. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A power converter module of a switched mode power converter, the power converter module comprising:
   an interface circuit, the interface circuit comprising
      a timing circuit configured to isolate a switch instant of a switch of a switched mode power converter, wherein switching of the switch at least partially causes an oscillating signal component within a signal after each switch instant; and
      a detector circuit configured to detect a first peak voltage and a second peak voltage of the oscillating signal component after the isolated switch instant;
   a computer-readable medium having computer-readable instructions stored thereon, the instructions configured to cause the power converter module to
      receive a first value for the detected first peak voltage and a second value for the detected second peak voltage; and
      estimate a temperature of the power converter module using the received first value and the received second value by solving a quadratic equation for the temperature having the form $(B_1A_2-B_2A_1)T^2+(E_1A_2-A_1E_2+B_1C_2-C_1B_2-v_1A_2+v_2A_1)T+E_1C_2-C_1E_2+v_2C_1-v_1C_2=0$; where T is the temperature, $v_1$ is the first value, $v_2$ is the second value, and $A_1, A_2, B_1, B_2, C_1, C_2, E_1$, and $E_2$ are best-fit parameters; and
   a processor, the processor coupled to the computer-readable medium to execute the instructions.

2. The power converter module of claim 1 wherein the instructions are further configured to cause the power converter module to remove a bus voltage component of the signal.

3. The power converter module of claim 1 wherein the switch instant is a turn-on switch instant of the switch.

4. The power converter module of claim 3 wherein the instructions are further configured to cause the power converter module to remove a portion of the oscillating signal component caused by a turn-off switch instant of the switch.

5. The power converter module of claim 1 wherein the switch instant is a turn-off switch instant of the switch.

6. A power converter module of a switched mode power converter, the power converter module comprising:
   an interface circuit, the interface circuit comprising
      a timing circuit configured to isolate a switch instant of a switch of a switched mode power converter, wherein switching of the switch at least partially causes an oscillating signal component within a signal after each switch instant; and
      a detector circuit configured to detect a first peak voltage and an off-state voltage of the oscillating signal component after the isolated switch instant;
   a computer-readable medium having computer-readable instructions stored thereon, the instructions configured to cause the power converter module to receive a first value for the detected first peak voltage and a second value for the detected off-state voltage; and estimate a temperature of the power converter module using the received first value and the received second value by solving a linear equation for the temperature having the form $v_1=(F_1V_o+B_1)T+G_1V_o+E_1$; where T is the temperature, $v_1$ is the first value, $V_o$ is the second value, and $B_1$, $E_1$, $F_1$, and $G_1$ are best-fit parameters.

7. The power converter module of claim 6 wherein the instructions are further configured to cause the power converter module to remove a bus voltage component of the signal.

8. The power converter module of claim 6 wherein the switch instant is a turn-on switch instant of the switch.

9. The power converter module of claim 8 wherein the instructions are further configured to cause the power converter module to remove a portion of the oscillating signal component caused by a turn-off switch instant of the switch.

10. A power converter module of a switched mode power converter, the power converter module comprising:
a timing means for isolating a switch instant of a switch of a switched mode power converter, wherein switching of the switch at least partially causes an oscillating signal component within a signal after each switch instant;
a detecting means for detecting a first peak voltage and a second peak voltage of the oscillating signal component after the isolated switch instant; and
a processing means for executing computer-readable instructions, the instructions configured to cause the power converter module to
receive a first value for the detected first peak voltage and a second value for the detected second peak voltage; and
estimate a temperature of the power converter module using the received first value and the received second value by solving a quadratic equation for the temperature having the form $(B_1A_2-B_2A_1)T^2+(E_1A_2-A_1E_2+B_1C_2-C_1B_2-v_1A_2+v_2A_1)T+E_1C_2-C_1E_2+v_2C_1-v_1C_2=0$: where T is the temperature, $v_1$ is the first value, $v_2$ is the second value, and $A_1$, $A_2$, $B_1$, $B_2$, $C_1$, $C_2$, $E_1$, and $E_2$ are best-fit parameters.

11. A method of estimating a temperature at a component of a device, wherein the temperature may be used to provide thermal load management of the device, the method comprising:
isolating a switch instant of a switch wherein switching of the switch at least partially causes an oscillating signal component within a signal after each switch instant;
detecting a first peak voltage and a second peak voltage of the oscillating signal component; and
estimating a temperature of a component of a device using the detected first peak voltage and the detected second peak voltage by solving a quadratic equation for the temperature having the form $(B_1A_2-B_2A_1)T^2+(E_1A_2-A_1E_2+B_1C_2-C_1B_2-v_1A_2+v_2A_1)T+E_1C_2-C_1E_2+v_2C_1-v_1C_2=0$: where T is the temperature, $v_1$ is the first peak voltage, $v_2$ is the second peak voltage, and $A_1$, $A_2$, $B_1$, $B_2$, $C_1C_2$, $E_1$, and $E_2$ are best-fit parameters.

12. The method of claim 11 wherein the switch is a semiconductor switch.

13. The method of claim 11 wherein the component is a semiconductor switch.

14. The method of claim 11 wherein the component is a power converter module.

15. The method of claim 11 wherein the device is a power converter, the power converter comprising a plurality of power converter modules that supply a load based on a known switching cycle, the known switching cycle using an interleaved commutation sequence.

16. The method of claim 15, wherein the switch is associated with any of the plurality of power converter modules.

17. The method of claim 11 wherein the signal is selected from the group consisting of an input bus voltage signal, an output bus voltage signal, an input bus current signal, and an output bus current signal.

18. The method of claim 17 further comprising removing a bus voltage component of the signal.

19. The method of claim 18 wherein removing the bus voltage component of the signal uses a high pass filter.

20. The method of claim 11 wherein the switch instant is a turn-on switch instant of the switch.

21. The method of claim 20 further comprising removing a portion of the oscillating signal component caused by a turn-off switch instant of the switch.

22. The method of claim 21 wherein removing the portion of the oscillating signal is performed using an analog multiplexer.

23. The method of claim 11 wherein the switch instant is a turn-off switch instant of the switch.

24. The method of claim 11 wherein the second peak voltage of the oscillating signal component is detected after detecting the first peak voltage.

25. The method of claim 11 wherein the first peak voltage is selected from the group consisting of a positive peak voltage and a negative peak voltage.

26. The method of claim 11 wherein the second peak voltage is selected from the group consisting of a positive peak voltage and a negative peak voltage.

27. The method of claim 11 wherein isolating the switch instant is performed based on a known switching cycle.

28. The method of claim 11 wherein isolating the switch instant is performed using a transistor based switching circuit.

29. The method of claim 11 further comprising performing thermal load management of the device using the estimated temperature.

30. A method of estimating a temperature at a component of a device, wherein the temperature may be used to provide thermal load management of the device, the method comprising:
calculating best-fit parameters for best-fit curves, wherein the best-fit parameters are calculated by
(a) defining an operating range of a fitting parameter;
(b) selecting an operating value from the operating range, wherein a switching cycle is based on the selected operating value;
(c) switching a switch based on the selected operating value;
(d) measuring a first temperature of a device;
(e) isolating a first switch instant of the switch wherein switching of the switch at least partially causes a first oscillating signal component within a signal after the first switch instant;
(f) detecting a first peak voltage value of the first oscillating signal component after the isolated first switch instant;
(g) detecting a second peak voltage value of the first oscillating signal component after detecting the first peak voltage value;
(h) saving the measured first temperature, the detected first peak voltage value, and the detected second peak voltage value;
(i) repeating (d)-(h) for a range of temperatures between an initial temperature and a final temperature;

(j) for the final temperature, calculating a first slope and a first intercept of a first curve fitting the detected first peak voltage value and the measured first temperature;

(k) for the final temperature, calculating a second slope and a second intercept of a second curve fitting the detected second peak voltage value and the measured first temperature;

(l) saving the selected operating value, the calculated first slope, the calculated first intercept, the calculated second slope, and the calculated second intercept;

(m) repeating (b)-(l) for the defined operating range;

(n) after processing the defined operating range, calculating a third slope and a third intercept of a third curve fitting the calculated first slope and the selected operating value, wherein $A_1$ is the third slope and $B_1$ is the third intercept;

(o) after processing the defined operating range, calculating a fourth slope and a fourth intercept of a fourth curve fitting the calculated first intercept and the selected operating value, wherein $C_1$ is the fourth slope and $E_1$ is the fourth intercept;

(p) after processing the defined operating range, calculating a fifth slope and a fifth intercept of a fifth curve fitting the calculated second slope and the selected operating value, wherein $A_2$ is the fifth slope and $B_2$ is the fifth intercept; and (q) after processing the defined operating range, calculating a sixth slope and a sixth intercept of a sixth curve fitting the calculated second intercept and the selected operating value, wherein $C_2$ is the sixth slope and $E_2$ is the sixth intercept;

isolating a second switch instant of the switch wherein switching of the switch at least partially causes a second oscillating signal component within the signal after the second switch instant;

detecting a third peak voltage and a fourth peak voltage of the second oscillating signal component; and estimating a temperature of a component of the device using the calculated best-fit parameters, the detected third peak voltage, and the detected fourth peak voltage.

31. The method of claim 30 wherein the operating value is a duty ratio value.

32. The method of claim 30 wherein the operating value is an off-state voltage value.

33. A method of estimating a temperature at a component of a device, wherein the temperature may be used to provide thermal load management of the device, the method comprising;

isolating a switch instant of a switch wherein switching of the switch at least partially causes an oscillating signal component within a signal after each switch instant;

detecting a first peak voltage and an off-state voltage of the oscillating signal component; and estimating a temperature of a component of a device using the detected first peak voltage and the detected off-state voltage and solving a linear equation for the temperature, the linear equation having the form $v_1=(F_1V_o+B_1)T+G_1V_o+E_1$; where T is the temperature, $v_1$ is the first peak voltage, $V_o$ is the off-state voltage, and $B_1$, $E_1$, $F_1$, and $G_1$ are best-fit parameters.

34. The method of claim 33 further comprising removing a bus voltage component of the signal.

35. The method of claim 33 wherein the switch instant is a turn-on switch instant of the switch.

36. The method of claim 35 further comprising removing a portion of the oscillating signal component caused by a turn-off switch instant of the switch.

37. The method of claim 33 wherein the switch instant is a turn-off switch instant of the switch.

* * * * *